United States Patent [19]

Faggin

[11] 3,753,011

[45] Aug. 14, 1973

[54] POWER SUPPLY SETTABLE BI-STABLE CIRCUIT

[75] Inventor: Federico Faggin, Cupertino, Calif.

[73] Assignee: Intel Corporation, Santa Clara, Calif.

[22] Filed: Mar. 13, 1972

[21] Appl. No.: 234,259

[52] U.S. Cl. ............ 307/247 R, 307/238, 307/251, 307/279, 307/296

[51] Int. Cl.... H03k 17/22, H03k 3/286, H03k 3/33

[58] Field of Search ................ 307/205, 238, 247 R, 307/251, 279, 289, 291, 304, 297

[56] References Cited

UNITED STATES PATENTS

| | | | |
|---|---|---|---|
| 3,550,097 | 12/1970 | Reed | 307/279 X |
| 3,573,758 | 4/1971 | Henle | 307/279 X |
| 3,636,530 | 1/1972 | Mark et al. | 307/279 X |
| 3,656,010 | 4/1972 | Huyben et al. | 307/279 |
| 3,660,827 | 5/1972 | Tickle | 307/279 X |
| 3,676,700 | 7/1972 | Buchanan | 307/279 X |

*Primary Examiner*—John W. Huckert
*Assistant Examiner*—L. N. Anagnos
*Attorney*—Spensley, Horn & Lubitz

[57] ABSTRACT

A circuit for setting a bi-stable circuit such as a flip-flop in a predetermined state when power is applied to the bi-stable circuit is disclosed. The circuit is fabricated using MOS technology and does not require the fabrication of an RC circuit.

10 Claims, 1 Drawing Figure

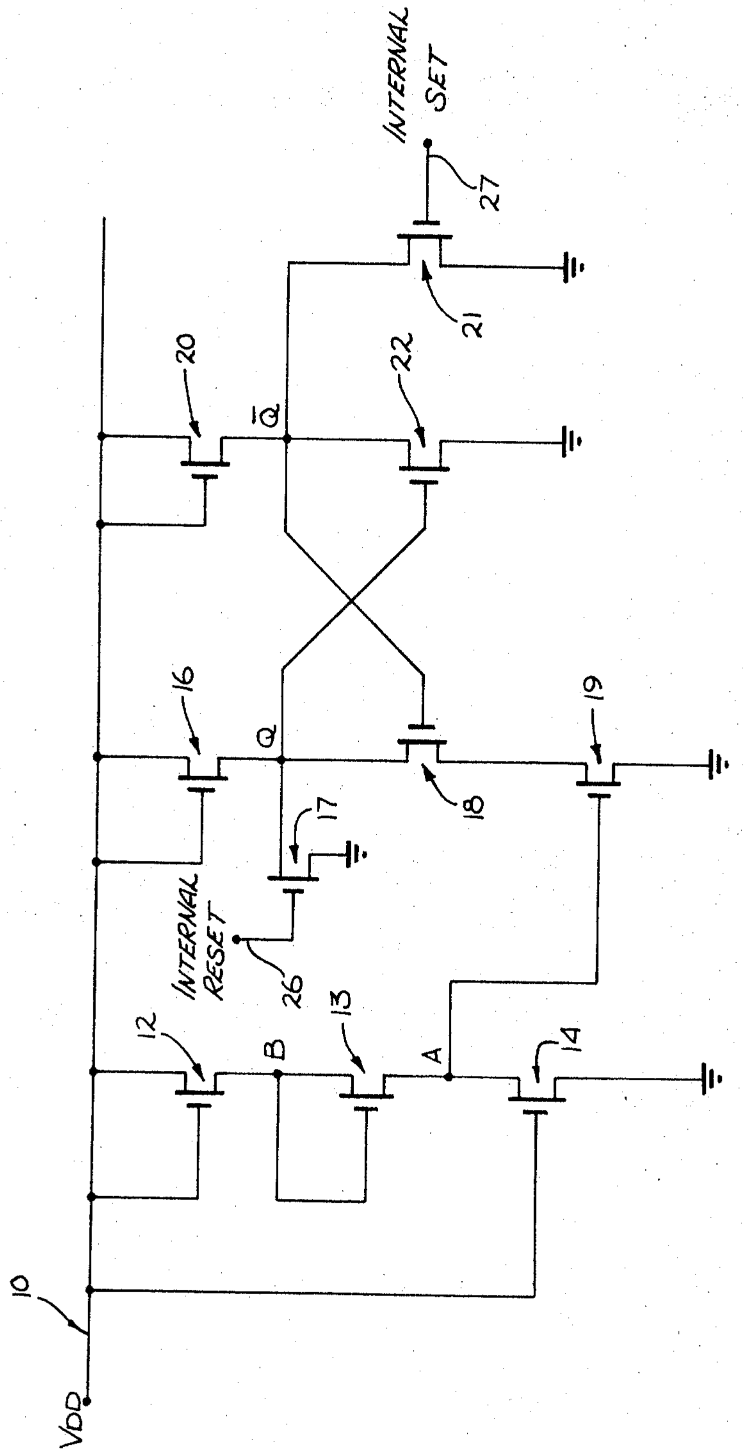
INTERNAL SET
27
21
20
22
$\bar{Q}$
16
Q
19
18
17
INTERNAL RESET
26
12
B
13
A
14
10
VDD

POWER SUPPLY SETTABLE BI-STABLE CIRCUIT

BACKGROUND OF THE INVENTION

1. Field of the Invention

The invention relates to the field of means for setting a bi-stable circuit in a predetermined state.

2. Prior Art

In many applications, particularly those utilizing binary circuits, it is desirable to know the state of a bistable circuit such as a flip-flop after power has been applied to the circuit. Often where it is impractical to use circuitry to force the bi-stable circuit into a predetermined state after the application of power, separate signal or signals are used to assure that the flip-flop is in a desired predetermined state. These signal or signals in the case of integrated circuits such as memory circuits are generally generated external to the chip or substrate upon which the bi-stable circuits are fabricated and hence require the use of an additional lead connected to the chip or substrate. This obviously is an undesirable situation since the addition of a single lead in some instances can be quite costly.

In the prior art circuits are disclosed for assuring that a bi-stable circuit is set in a predetermined state when power is applied in the circuit. These setting circuits utilize capacitors or RC network in order to set the bistable circuit in the desired state when power is applied in the circuit. In typical power supplies it often takes as much as 10 mseconds for the power to reach a steady state condition. Because of this relatively long period of time, large capacitors (in the order of microfarads) are required in such circuits. For bi-stable circuits which use field effect devices, particularly those which utilize metal-oxide-semiconductor (MOS) or metal-insulated-semiconductors (MIS) technology, such capacitances cannot be practically fabricated on a chip or substrate which includes the field effect devices.

The present invention discloses a circuit for setting a bi-stable circuit in a predetermined state when power is initially applied to the circuit which may be fabricated utilizing MOS or MIS technology and which may be included on a substrate or chip which includes the bistable circuits.

SUMMARY OF THE INVENTION

A circuit for setting a bi-stable circuit in a predetermined state when power is applied to the bi-stable circuitry is described. A field effect device which acts as switching means is coupled into one branch of the bistable circuit; the delayed signal applied to the gate of this device is utilized to assure that the other branch of the bi-stable circuit conducts after power is applied to the bi-stable circuit. The gate of this device is coupled to the power supply through a first and a second field effect device. The first device has one of its regions and its gate coupled to the source of power and its other region coupled to one region and the gate of the second device. The second device has its other terminal coupled to the gate of the switching means. An additional field effect device is also coupled to this gate in the preferred embodiment to rapidly discharge this gate after removal of the supply voltage.

BRIEF DESCRIPTION OF THE DRAWINGS

The FIGURE illustrates the presently preferred embodiment of the invention and its interconnections with a bi-stable circuit.

DETAILED DESCRIPTION OF THE INVENTION

Referring to the FIGURE, the circuit for setting the bi-stable circuit in a predetermined state in the presently preferred embodiment comprises field effect devices 12, 13, 14 and 19. These devices are illustrated coupled into a bi-stable circuit having two branches, the first comprising field effect devices 16, 18 and 19 and the second comprising field effect devices 20 and 22.

In the bi-stable circuits shown as a typical flip-flop, field effect device 16 has one of its regions and its gate coupled to a source of power shown as lead 10 and its other regions coupled to the Q terminal of the flip-flop. Likewise in the other branch of the flip-flop, field effect device 20 has one of its regions and its gate coupled to lead 10 and its other region coupled to the Q terminal of the flip-flop. Field effect device 18 has one of its regions coupled to the Q terminal of the flip-flop and its other regions coupled to one region of the field effect device 19. The gate of device 18 is coupled to the Q terminal in the other branch of the flip-flop. In a like manner, field effect device 22 has one of its regions coupled to the Q terminal of the flip-flop, its other region coupled to ground, and its gate coupled to the Q terminal of the flip-flop. Field effect devices 17 and 21, also illustrated, may be utilized to set and re-set the flip-flop from one state to the other by the application of signals to leads 26 and 27.

Field effect device 12 has its gate and one of its regions coupled to lead 10 while its other region, designated as node B, coupled to one region and the gate of field effect device 13. The other region of the field effect device 13, designated as node A, is coupled to the gate of field effect device 19 and to one region of field effect device 14. The other region of field effect device 14 is coupled to ground and its gate is coupled to the source of power, lead 10.

In the presently preferred embodiment all the field effect devices comprise field effect transistors, each of which includes a pair of regions commonly referred to as the source and drain, and a gate. The gate in the presently embodiment comprises a polycrystalline silicon. The setting circuit and the flip-flop may be fabricated as an integrated circuit on a semiconductor body or substrate such as silicon, utilizing MOS and MIS technology.

Without the setting circuit, if power were applied to lead 10, it would be impossible to predict the state of the bi-stable circuit after the power is applied (assuming device 19 did not effect the flip-flop). That is, it cannot be predicted whether current would be flowing through the branch of the flip-flop comprising devices 16 and 18, or through that branch of the flip-flop which comprises devices 20 and 22 after the application of power. With the circuit shown in the FIGURE, once power is applied to lead 10, the voltage build-up at node B and terminals Q and Q of the flip-flop would be approximately the same since devices 12, 16 and 20 all are field effect devices operating as resistance means. Because of field effect device 13, the voltage at node A will build up more slowly than the voltage at nodes B, Q or Q. Since the voltage at node A builds up more slowly field effect device 19, which acts as a switch in one branch of the flip-flop, prevents current from initially flowing through devices 16 and 18. Thus, the voltage at the Q terminal of the flip-flop will rise, thereby causing current to flow in the branch of the flip-flop comprising devices 20 and 22. Thus each time power is interrupted and reapplied, the flip-flop will again be in the predetermined state, that is, the state where current is flowing through the branch of the flip-flop which includes the Q terminal.

Without field effect device 14 to discharge node A, discharging occurs at the rate of approximately 0.1 volt per millisecond; thus sufficient time must elapse between the reapplication of power to lead 10 to allow this node to discharge. With use of device 14 it has been found that the discharge rate at node A is approximately 1 volt per 50 nanoseconds, thus allowing power to be reapplied to lead 10 after a much shorter period of time.

In fabricating devices 12, 13 and 14, it is necessary to assure that the voltage drop across devices 12 and 13 is much less than the voltage drop across device 14. Thus node A, once a steady state condition is reached, should be at potential close to $(V_{DD}-2V_T)$ where $V_T$ is the threshold voltage of each MOS transistor, in order for device 19 to be fully conductive and not to affect the operation of the bi-state circuit. Commonly known fabrication techniques may be utilized to achieve the required voltage conditions.

Thus, a circuit has been disclosed which when coupled into a bi-stable circuit places the bi-stable circuit into a predetermined state when power is applied to the bi-stable circuit. The circuit may be fabricated utilizing MOS or MIS technology and may be included on the same chip or substrate as the bi-stable circuit.

I claim:

1. A circuit for setting a bi-stable circuit having at least one branch in a predetermined state when power is applied to the bi-stable circuit from a source of power comprising:

resistor means coupled to said source of power;

a first field effect device having at least a gate and two regions, said gate and one region being coupled to said resistor means;

a second field effect device coupled into said branch of said bi-stable circuit and having its gate coupled to the other region of said first field effect device;

whereby when power from said source is applied to said bi-stable circuit said bi-stable circuit is set in a predetermined state.

2. The circuit defined in claim 1 wherein said resistor means comprises a third field effect device with its gate and one region coupled to said source of power and its other region coupled to said one region and gate of said first field effect device.

3. The circuit defined in claim 2 including a fourth field effect device having its gate coupled to said source of power, one of the regons coupled to the said other region of said first field effect device and its other region coupled to ground.

4. The circuit defined in claim 3 wherein said first, second, third and fourth field effect devices include silicon gates.

5. A bi-stable circuit settable in a predetermined state by application of power from a source of power to the circuit comprising:

a flip-flop circuit having at least two branches, one of which includes a first field effect device having a gate and two regions, said two regions being coupled in series in said one branch; said flip-flop circuit being coupled to said source of power;

a second field effect device having a gate and two regions, one region and said gate being coupled to said source of power;

a third field effect device having a gate and two regions; said gate and one of said regions being coupled to said other region of said second field effect device and said other region being coupled to the gate of said first field effect device;

whereby by the application of power through said source of power to said bi-stable circuit current will flow in a predetermined branch of said circuit.

6. The circuit defined in claim 5 including a fourth field effect device having a gate and two regions, said gate being coupled to said source of power, one of said regions being coupled to said gate of said first field effect device and the other region of said field effect device being coupled to ground.

7. A setting circuit for causing current to initially flow in a predetermined branch of a bi-stable circuit having two branches when the bi-stable circuit is coupled to a source of potential comprising:

switching means coupled into one branch of said bi-stable circuit, said switching means including a control lead;

a first field effect transistor having its gate and its source coupled to said source of potential;

a second field effect transistor having its gate and its source coupled to the drain of said first field effect transistor and its drain coupled to the control lead of said switching means;

whereby when said setting circuit and bi-stable circuit are coupled to said source of potential, current will initially flow in said other branch of said bi-stable circuit.

8. The circuit defined in claim 7 wherein said switching means includes a third a third field effect transistor having its source and drain coupled in series in said one branch of said bi-stable circuit and its gate coupled to the drain of said second field effect transistor.

9. The circuit defined in claim 8 including discharge means for discharging the gate of said third field effect transistor when said source of potential is removed from said setting circuit.

10. The circuit defined in claim 9 wherein said discharge means comprises a fourth field effect transistor having its gate coupled to said source of potential, its source coupled to said gate of said third field effect transistor and its drain coupled to ground.

* * * * *